United States Patent [19]

Barns

[11] 4,260,457
[45] Apr. 7, 1981

[54] APPARATUS FOR CONTINUOUS AZEOTROPIC PROCESSING OF VEGETABLE AND PROTEIN MATERIAL

[76] Inventor: Roy W. Barns, P.O. Boc 215-B, R.R. 1, Broadway, Va. 22815

[21] Appl. No.: 14,090

[22] Filed: Feb. 22, 1979

Related U.S. Application Data

[63] Continuation-in-part of Ser. No. 802,021, May 31, 1977, abandoned, which is a continuation of Ser. No. 550,157, Feb. 14, 1975, abandoned.

[51] Int. Cl.³ ............................................... B01D 3/42
[52] U.S. Cl. .................................. 202/160; 202/170; 202/206

[58] Field of Search ............... 202/234, 153, 158, 170, 202/160, 206; 260/412.8, 428.5; 23/270 R, 270.5 T; 203/DIG. 16, 96, 49, 43, 92, 88; 196/14.52

[56] References Cited

U.S. PATENT DOCUMENTS

| 2,054,096 | 9/1936 | Potts et al. | 203/87 |
| 2,112,805 | 3/1938 | Bonotto | 260/412.8 |
| 2,706,708 | 4/1955 | Frank et al. | 203/92 |
| 3,503,854 | 3/1970 | Good | 260/428.5 |
| 3,867,416 | 2/1975 | Barns | 260/412.8 |

*Primary Examiner*—Frank Sever
*Attorney, Agent, or Firm*—Shlesinger, Arkwright, Garvey and Dinsmore

[57] ABSTRACT

An azeotropic column has staged processing, separate dehydration load control, and integral flash desolventizing for greater capacity, efficiency, and control of conditions in a plural stacked fluidized bed column.

14 Claims, 6 Drawing Figures

FIG. I

APPARATUS FOR CONTINUOUS AZEOTROPIC PROCESSING OF VEGETABLE AND PROTEIN MATERIAL

BACKGROUND OF INVENTION

This invention relates to an azeotropic process for obtaining oil and high protein product from animal, fish, or vegetable material. This application is a continuation-in-part of co-pending application Ser. No. 802,021, filed May 31, 1977 now abandoned, which was a continuation of Ser. No. 550,157, filed Feb. 14, 1975, now abandoned.

This invention is an improvement over the column azeotropic extraction unit disclosed in my previously issued U.S. Pat. No. 3,867,416, dated Feb. 18, 1975. This patent introduced the use of a series of vertically spaced fluidized beds through which solvent vapor was passed upwardly through the column in counterflow to descending solid particles which passed through plates supporting the beds. The vapor, preferably superheated, picks up oil and moisture from the material during the course of its travel from the bottom to the top of the column. A liquid pool of miscella containing oils removed from the particles, and liquid solvent from vapor which has condensed during the course of the process is removed from the top of the column, while the dried marc of flour-like consistency from which the oil and moisture has been removed by the solvent vapor, is taken from the bottom of the column.

A balance of upward vapor velocity, particle size and quantity of material, and heat and moisture balance throughout the length of the column, is necessary to bring about this result, as particularly set forth in the description of Barns U.S. Pat. No. 3,867,416. Maintaining these conditions imposed a severe limitation on preparation of the column, and restricted output of the column.

SUMMARY AND FEATURES OF INVENTION

Accordingly, it is a principal feature of this invention to improve upon the existing azeotropic column design, particularly the azeotropic extraction column of Barns U.S. Pat. No. 3,867,416.

It is a further feature of this invention to provide an azeo-extraction column which has a significant increase in capacity for a given size unit.

A still further feature of the invention is to bring about more effective control of conditions within the column.

A still further object of the invention is to provide a column which has distinct sections in which a given operation can be more effectively carried out than heretofore.

It is a still further object of this invention to provide an improvement in column design in which the dehydration load within the column is divided and more effectively handled.

Another feature of this invention is an improved valve design at the perforated plates which permits more effective downward settling of the particles of the beds through the column.

Another feature of the invention is the provision of an improved feed technique which creates a more desirable particle for the fluidized beds of the column.

A still further feature of this invention is the provision of an improved non-clogging miscella removal assembly for the column.

A still further feature of this invention is the provision of an auxiliary vapor feed to readily remove unbound moisture at the dehydration section adjacent the top of the column.

A still further feature of this invention is the improved regulation of upward solvent vapor flow to permit better downward settling of the particles.

A still further feature of this invention is the more effective transport and desolventizing of the dried material which leaves the bottom of the column.

A still further feature of this invention is the providing of an extraction column which requires less auxiliary equipment than possible heretofore.

DESCRIPTION OF THE INVENTION

Figure 1:
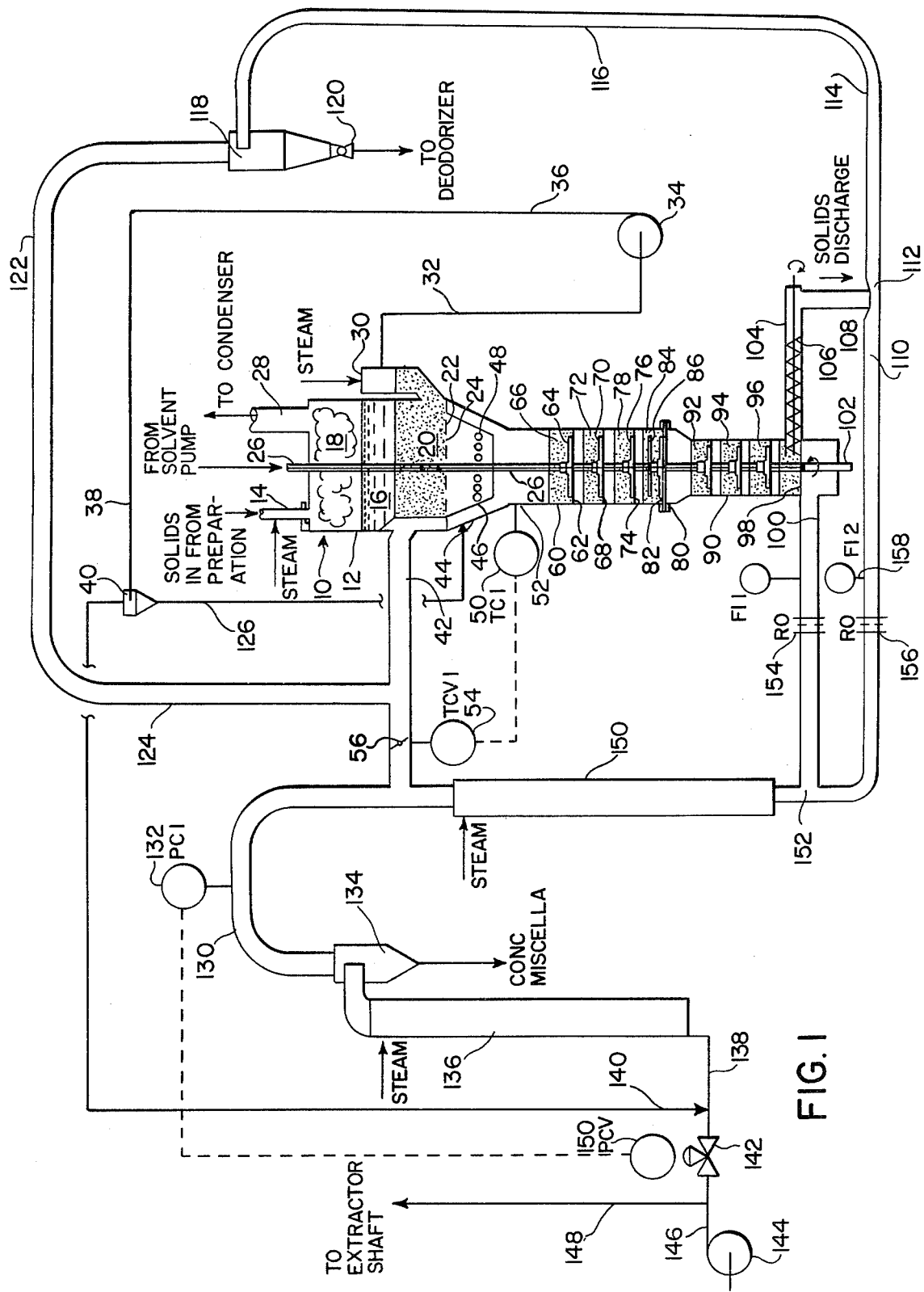
FIG. 1 is a schematic view showing the azeotropic extraction system, showing in cross section the extractor column.

Referring to FIG. 1, the extractor column generally indicated at 10 is an elongated continuous structure which has three principal sections. The upper dehydration section 12 has the largest diameter and is the section in which unbound water is removed from the feed. The feed is introduced at the top of the dehydration section through the inlet 14 and into the pool of liquid miscella 16 which contains the liquefied solvent vapor and oils removed from the feed.

Immediately above the liquid miscella pool 16 is an active turbulent area 18 containing an azeotropic mixture of solvent vapor and water vapor. The pool of miscella is in a continual state of turbulent boiling and bubbling.

Figure 2:
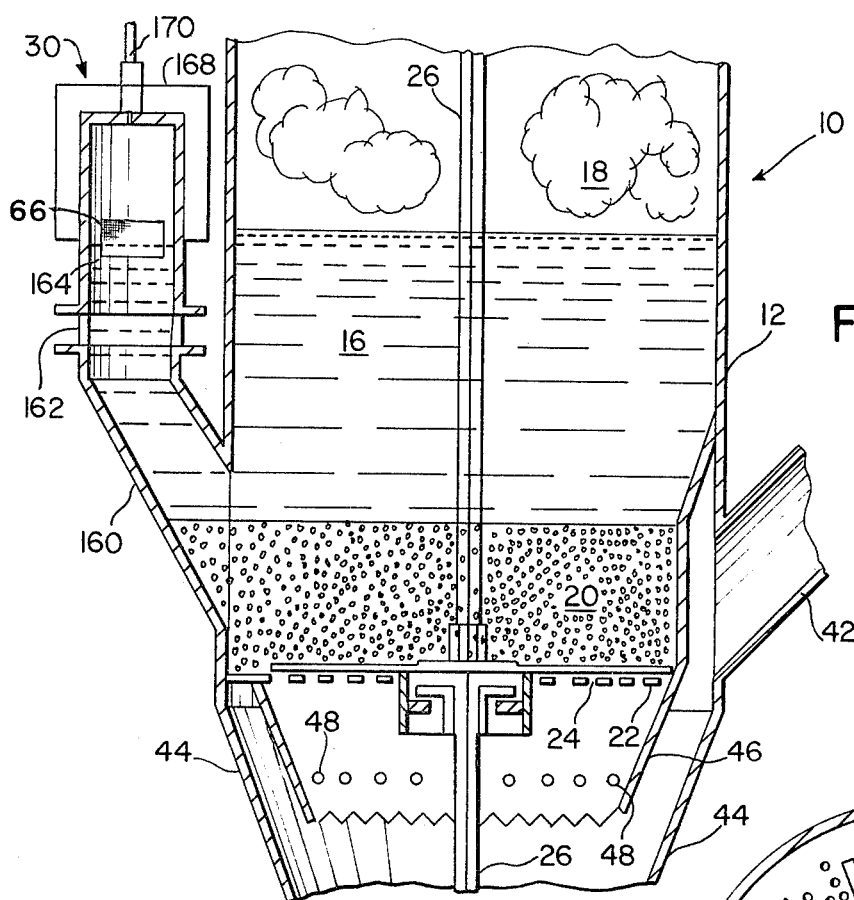
FIG. 2 is an enlarged cross-sectional view of the upper section of the extractor column of FIG. 1.

The uppermost bed 20 which extends across the top section of the column is supported on a perforated metal plate 22. The bed consists of an accumulation of feed particles which are in a continuous moving state. The movement of the feed particles in the bed is brought about by the upward travel of solvent vapor through a plurality of perforations 24 in the plate 22. FIG. 2 shows in greater detail the arrangement in this dehydration section. Turbulence created at 18 above the miscella pool 16 is caused by the very rapid passage of solvent vapors through the openings 24 in the plate 22 and upwardly through the bed of feed particles 20 and the miscella pool 16 to produce the roaring, turbulent, surging condition in the miscella pool.

The hollow shaft 26 extends downwardly through the center of the column and supports a plurality of rotating blades such that one blade is supported in a plane of rotation slightly above each of the plates in the column. The blades are both supported above each of the plates in the column, and are rotated by the hollow shaft 26. An upper set of blades 25 is disposed above the plate 22 and slightly spaced from its upper surface. A bearing support assembly 27 shown in FIG. 2 supports the hollow rod 26 within the column.

All of the water removed (in vapor form) with the required solvent vapor is taken from the top of the column through the exhaust conduit 28 which is connected to the condenser.

A miscella takeoff assembly generally indicated at 30 is located externally of the column and contains a screen assembly through which the miscella is passed along line 32 to the miscella pump 34 and upwardly and across line 38 to the liquid clarifier unit 40.

The solvent vapor supply line 42 is directly connected to the upper section of the column 12 and supplies the largest percentage of solvent vapor to the unit. It is supplied to the transition portion of the dehydration section, which is the reduced section which constitutes the inwardly flared section 44. The vapor passes down below the skirt 46 and up into the column, as well as through the row of plural openings 48 immediately below the upper perforated plate 22 for the bed 20.

In this section the temperature control sensor 50 is located as shown schematically in FIG. 1 and is positioned at 52. It controls the temperature control valve 54 which has a butterfly valve 56 in the vapor supply line 58. This is opened and shut according to the temperature of the azeotrope at this point in the column.

The intermediate section of the column includes an extraction section 60 of reduced diameter in which the perforated plate 62, similar to perforated plate 22, extends across the column immediately below a blade assembly 64 rotatably mounted on shaft 26. A fluidized bed 66 of feed particles is disposed and supported above the perforated plate 62.

As required, other fluidized beds of feed material are disposed immediately below bed 66 above the extraction section. As shown in FIG. 1, a perforated plate 68 having a rotatable blade assembly 70 disposed above it supports a fluidized bed 72. Similarly, perforated plate 74 and rotatable blade assembly are disposed at the bottom of the fluidized bed 78. At the lower end of the extraction section a lowermost perforated plate 80 supports a fluidized bed 84 of feed particles and has rotatable blade assembly 86 disposed slightly above it for rotation with the shaft 26.

In this section, there is an additional rotating assembly 86 which has hollow elements, the interior of which are connected to the central hollow portion of the shaft 26. This assembly forms a conduit for fresh liquid solvent to be supplied to the lower portion of the extraction section of the column. The hollow assembly 86 rotates with the shaft 26 to evenly dispense liquid solvent to this portion of the column. It is carried upwardly through the other beds by the solvent vapor which is introduced at the bottom of the column and will be discussed hereafter.

The stripping section 90 is the narrowest section of the column and has three successive fluidized beds 92, 94, and 96. It is supported by perforated plates and also has a rotating blade assembly connected to the central hollow shaft 26.

The lowermost plate supports the lowest bed of particulate material in the discharge section. A rotating sweeper arms assembly, not shown, moves the material from this plate into the auger casing 104 which has a double flight conveyor section 106. It should be noted that the auger and flight assembly provide a sealing arrangement from the lower part of the column by use of a plug seal technique in which several of the flights are left off and the accumulated material in that space serves as a sealing plug.

The perforated plate 98 serves to support the lowermost bed of dried material which leaves the stripping section.

The superheated vapor is introduced to the bottom of the column along line 100 and flows up through the perforations in the perforated plate 98. It should be noted that the material is moved across the plate to the conveyor by a rotating blade assembly connected to the shaft which is not shown. The rotating shaft 26 has its bottom end connected to a rotating drive assembly, not shown.

Solids are discharged from the conveyor through the vertical depending tube 108 to the reduced diameter acceleration section 112 of the superheated solvent vapor supply line 110.

The superheated vapor traveling along the line 110 is under pressure and on reaching the reduced section 112 picks up velocity and entrains in the accelerated stream of superheated vapor, the marc or flour-like material, carried from the lowermost bed of the column by the conveyor 104.

The superheated solvent vapor traveling along line 110 with the entrained material is carried along pipe line 114 and upward vertically through section 116 to the centrifugal separator 118. The solids are separated out and discharged through the lower valve 120 of the cyclone separator to the deodorizer and final processing.

The section of the line from 112, including 114 and 116, comprises what is known as a flash desolventizing section. It acts to further dry the material coming from the bottom of the column by removing the solvent that remains in the material. The superheated solvent vapor acting upon the smaller amount of material containing some condensed liquid solvent acts to vaporize it and in so doing dries the material prior to its arrival at the cyclone separator 118.

The superheated solvent vapor, together with some vaporized solvent obtained from the solid material dropped into line 110 by the conveyor travels along line 122 and is carried downward through line 124 to be returned to the upper dehydration section of the column by line 42.

This feature permits a large volume of superheated solvent vapor to be introduced to the column at a critical point in the process and produces most of the dehydration.

In the upper dehydration section 12 of the column, most of the water is unbound water, which is readily evaporated in a very rapid process.

Below this point, the water is termed bound water, in that it is within the particulate material cellular structure itself, and requires a long exposure time to solvent vapor and liquid solvent action.

The bulk of the superheated vapor required for the process is used in this dehydration section, performing the dehydration of unbound water and carrying it upward through the top bed 20, miscella pool 16, and out the line 28 to the condenser.

The line 126 shown running downwardly from the liquid cyclone separator 40 contains some solids that were picked up in the miscella stream and returned to the transition section of the dehydration portion 12 of the column.

Vapor supply line 130 has a pressure sensing element 132 which acts to control vapor flow therethrough as a supplement for the vapor supplied along line 42 from the flash desolventizing system coming from line 124.

When the temperature drops to a point slightly above the azeotropic boiling point and is sensed by the sensing element 50 at 52, the temperature control valve opens, supplying additional solvent vapor along line 130 to offset the increased dehydration load and to assist in raising the temperature in the column at point 52 to the desired temperature (above).

A sensing element 132 is located in line 130 and this controls the flow of vapor from the evaporator-separator 134.

The evaporator-separator 134 acts to separate the concentrated miscella and remove it from the stream, permitting liquid free solvent vapor to enter line 130.

The long tube evaporator 136 receives the miscella from the overflow of the liquid cyclone 40 along lines 138 and 140 and concentrates the miscella from fifteen to twenty percent oil to a range of fifty to seventy percent oil.

Valve 142 supplies additional solvent from line 146 and pump 144 from a solvent storage to supplement the liquid solvent required to provide the vapor needed in line 130. Line 146 supplies liquid solvent along line 148 which is supplied directly to the hollow rotating shaft 26.

It should be noted that the entire system is essentially self-contained, in that the bulk of the vapor and solvent vapor is recirculated, either directly or after separation from other constituents. The highest dehydration load is in the top dehydration section 12 of the column, and three-quarters approximately of the solvent vapor is supplied at this point to remove the unbound water.

The flow of solvent vapor along line 130 that is not supplied directly to the upper dehydration section 12 of the column returns to the superheater 150 to which heat input is supplied via the steam line indicated at the arrow. Superheated solvent vapor leaves the superheater by line 152 and is supplied directly to the bottom of the column by way of line 100 through the restrictive orifice 154. The restrictive orifice acts to restrict the flow to a desired quantity to be supplied to the bottom of the column on a sustained steady flow basis.

Flow indicator 158 (generally designated as FI2) indicates the flow through the line 110. Depending upon moisture content of the feed materials and other factors, this flow will be increased or decreased. However, it is approximately two to five times the flow of solvent vapor that is introduced in the bottom of the column.

Referring to FIG. 2, an enlarged section view from the opposite direction shown in the overall system schematic is shown, in which the upper fluidized bed 20 supports a pool of miscella 16.

The takeoff assembly 30, is mounted externally of the extractor column, and is connected thereto through a downwardly extending flanged conduit 160 through a heat sealing element 162.

The casing 164 includes a rectangular screen 166, which is positioned even with the upper surface level of the miscella pool. This screen is vibrated by mechanical means (not shown) to preclude clogging thereof. In addition, a steam line 170 is connected to the interior of the miscella takeoff housing through a fine orifice to keep a vapor at the screen on the water side of the azeotrope to preclude dehydration and consequent glazing of the screen surface. The miscella flows through the screen and is connected through a housing flange connection, not shown, to the takeoff line 32 of FIG. 1.

Figure 3:
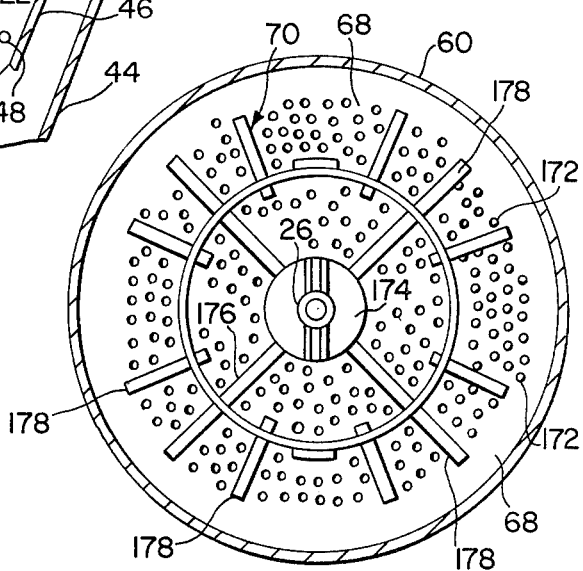
FIG. 3 is a horizontal section taken through the column above one of the plate and valve assemblies.

FIG. 3 shows a typical cross section of the column in plan view looking downwardly on the perforated plates and the rotating blade assembly. In this instance, however, the section is taken through the central extractor section 60 above perforated plate 68 and the rotating blade assembly 70. The plurality of openings 172 are disposed throughout the entire area of the plate, and the blades 176 which are generally of flat, rectangular configuration extend outwardly from the hub 174, the latter being attached to the hollow rotating shaft 26. Additional intermediate blades 178 supported on a ring fastened to the blades 176 fill the intermediate quadrant between the principal blades 176. It should be noted that this type of configuration is used for large diameter column design, while a small four-blade assembly would be sufficient for a smaller column diameter design.

Figure 4:
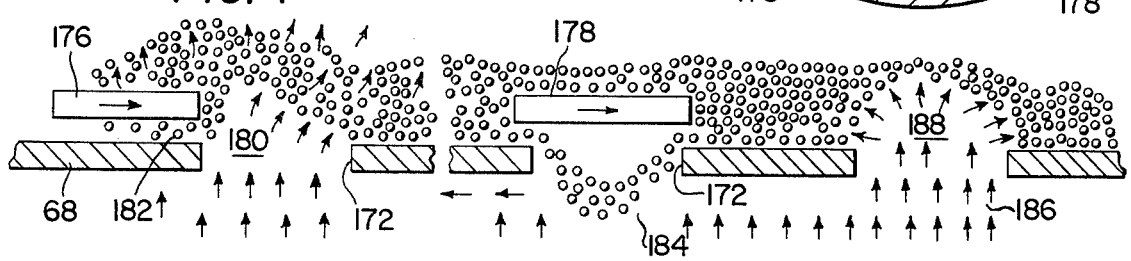
FIG. 4 is a partial cross-sectional view of a section of a typical plate showing interaction of the valve and upward vapor stream.

The valve action of the rotating blades is shown in FIG. 4 which is a partial section of the perforated plate 68. Note that the blades 176 are slightly spaced from the upper surface of the perforate plate 68 and that their width is sufficient to fully cover the opening 172. It has been determined that this is essential, in that the blade passing over the opening acts as a valve to assist in settling of the particles through the openings. This results from the cutoff of the upward flow of vapor through the openings 172. When this cutoff occurs, the particles tend to drop through the openings 172 to the fluidized bed immediately below it. As seen in the first opening, the pocket 180 begins to collapse because the velocity of the vapor which is below the so-called terminal velocity is reduced below that value and the particles drop. The pocket 188 at the right opening of FIG. 4 shows the supported condition in which the uninterrupted vapor flow 186 through the opening proceeds at a sufficient velocity to support the particles thereabove and to create the pocket 188.

Figure 5:
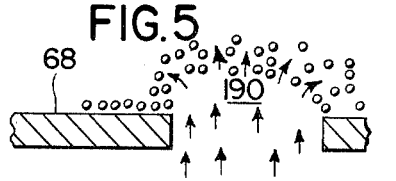
FIGS. 5 and 6 are partial views of a typical section of one of the columns illustrating the action of pulsed vapor flow.
Figure 6:
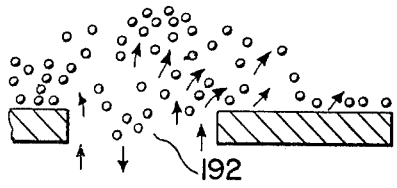

FIGS. 5 and 6 are directed to a pulse technique of vapor flow which is also of interest from the standpoint of particle settling through the openings and from bed to bed. In FIG. 5, the terminal velocity is shown as being sufficient to create and sustain the pocket 190, while in FIG. 6, the condition shown at 192 is one in which the terminal velocity of the vapor passing through the opening has been reduced below the terminal velocity and the particles have started to settle through the opening. This can be accomplished by systematically increasing and decreasing the vapor velocity flowing through the perforated plate openings, such that the lower vapor pressure supplies a vapor velocity below the terminal velocity, permitting collapse of the pressure pockets above the plate and settling of the particles through the plate openings. However, it should be kept in mind that the lower limit of the vapor velocity is the fluidizing velocity, inasmuch as the beds have to be maintained in a fluidized state by passing sifficient vapor upwardly through them to keep them in a state of particle movement. The pulsing can be accomplished by periodically reducing the supply pressure in the line 100.

Although not directly shown, it is important that the feed, particularly if seed material is being used, be finely ground and mixed with ten to twenty percent water. This paste is then forced through a die having openings approximately one-eighth of an inch in diameter with a direct feed into the top of the column through line 14. Due to the very turbulent conditions in the atmosphere 18 above the miscella pool 16, and the turbulence within the miscella pool itself, the extruded feed material breaks up into small spherical aggregates approximately one-eighth of an inch in diameter. The reason for the grinding, particularly with vegetable seeds is to promote exposure of the glutinous material to water to increase agglomeration followed by rapid dehydration in the top of the column which causes coagulation. The ph should also be kept in the 6–10 range.

With respect to the column design, it should be noted that the superficial velocity, (that is, the average cross-sectional velocity of the vapor upward through the column) is varied by changes in column diameter. This is an advantage of this column design in that the single flow of solvent vapor from the bottom of the column upwardly through it with a single starting velocity as a limiting factor, can be varied by changes in cross-sectional area of the column to either increase or decrease the velocity and the treatment time in each of the sections.

It should also be borne in mind that for a typical operation, about three times the amount of solvent is passed through the line 42 as against the superheated vapor passed through the line 100 at the bottom of the column. This is because the greatest dehydration load is at the top of the column where unabound water is to be removed. With the recognition of this concept, and the tie-in of the solvent line from the flash desolventizing system, it is possible to increase the capacity of the column by a factor of three to five fold.

In addition, a steady state of vapor flow and settling in the very critical areas of the lower portion of the column is maintained, and variations due to the amount of material or its water content are compensated for at the top of the column by the solvent vapor line 42. It should be noted that this vapor flow through line 42 is supplemented by flow through line 58 in accordance with the setting of valve 56. As mentioned earlier, this valve setting is controlled by the temperature in the transition section of the column at 46. The desired temperature for this control is a few degrees above the azeotropic boiling point.

While this invention has been described, it will be understood that it is capable of further modification, uses and/or adaptations of the invention following in general, the principle of the invention and including such departures from the present disclosure as come within known or customary practice in the art to which the invention pertains, and as may be applied to the essential features hereinbefore set forth, as fall within the scope of the invention or the limits of the appended claims.

What I claim is:

1. An azeotropic extraction assembly, comprising:
   (a) an elongated vertical column having an upper dehydration section, an intermediate extraction section, and a lower liquid solvent stripping section,
   (b) the extraction and stripping sections each having a series of vertically spaced perforate plate and rotating blade assemblies which act as dividers to divide the sections into superposed fluidized beds of oil containing solids,
   (c) the dehydration section including a perforated top plate assembly which directly supports a layer of oil bearing solid feed material above which there is a turbulent liquid miscella pool of liquid solvent, extracted oil, and free water,
   (d) solvent vapor supply means connected to the column immediately below the top plate of the dehydration section for supplying the major portion of solvent vapor to the column at a controlled rate,
   (e) miscella discharge means disposed at the top of the dehydration section above the top plate and adjacent the area where the liquid miscella accumulates for removing the miscella from the column,
   (f) a solvent vapor supply line connected to the bottom of the stripping section below the lowermost plate for supplying heated solvent vapor under elevated pressure to drive such vapors upwardly through the superposed fluidized beds of downwardly descending oil bearing solids to the top of the column, at a velocity which is higher than the minimum velocity to bring about a fluidized bed condition,
   (g) solid discharge means connected to the bottom of the column below the lowermost plate for removing the de-oiled solids,
   (h) sensing means associated with the column for obtaining information from the state of material in the column which is related to the azeotropic condition and amount of water in the unbound state at the dehydration section, and
   (i) control means connected to the solvent vapor supply means and responsive to the sensing means for varying the vapor supplied to the dehydration section to increase or decrease the amount of vapor supplied to the dehydration section for removal of unbound water from the oil-bearing solids to thereby maintain a constant dehydration load on the lower part of the column.

2. The azeotropic extraction assembly as set forth in claim 1, wherein:
   (a) a solvent vapor supply line is connected from the cyclone separator to the solvent vapor supply means.

3. The azeotropic extraction assembly as set forth in claim 1, wherein:
   (a) a solvent vapor flash desolventizing conduit is connected to the solid discharge means for transporting solids while simultaneously removing liquid solvent therefrom.

4. The azeotropic extraction assembly as set forth in claim 1 wherein:
   (a) the control means is a temperature controlled valve which controls flow of solvent vapor through the solvent vapor supply means, and
   (b) the sensing means is a temperature sensing element disposed adjacent and below the top plate and blade assembly of the dehydration section and is connected to the temperature control valve for sending a controlled signal to open the control valve to supply additional solvent vapor when the temperature at that location drops to within a few degrees above the azeotropic boiling point.

5. An azeotropic extraction assembly, comprising:
   (a) an elongated vertical column having a plurality of vertically spaced perforate plate and rotating blade assemblies disposed therein which act as dividers to divide the column when loaded into superposed fluidized beds of oil-containing solids, (b) a solvent vapor supply line connected to the bottom of the column below such plates for supplying heated solvent vapor under elevated pressure at a velocity sufficient to drive such vapors upwardly through the successive beds of oil-bearing solids to the top of the column to maintain the beds in a fluidized condition, (c) miscella discharge means disposed at the top of the column above the uppermost of the plate assemblies and adjacent the miscella pool location for removing miscella from the column, (d) discharge means connected to the bottom of the column below the lowermost plate for removing de-oiled solids, (e) solvent vapor supply means for introducing a variable quantity of solvent vapor below the uppermost of the top plates to maintain a constant dehydration load for the lower fluidized beds of the column, (f) flash desolventizing means including a conduit through which super heated vapor is passed and having an intermediate section with an opening through which solids from the discharge means are passed and carried through the downstream portion of the conduit which acts as a transport line, (g) the downstream end of the transport line being connected to a particle separator, and (h) the solvent vapor output from the particle separator being connected to the vapor supply means.

6. The azeotropic extraction assembly as set forth in claim 1 or 5, wherein:

(a) the miscella discharge means is disposed exterior of the column, and (b) means associated with the discharge means for precluding clogging thereof.

7. The azeotropic extraction assembly as set forth in in claim 6, wherein:

(a) the discharge means includes a housing having a screen through which the miscella passes, and (b) means associated with the screen for precluding formation of a dehydrating atmosphere at the screen.

8. The azeotropic extraction assembly as set forth in claim 3 or 5, wherein:

(a) a cyclone separator is connected to the downstream end of the elongated transport pipeline to effect separation of solids from the vapor.

9. The azeotropic extraction assembly as set forth in claim 8, wherein:

(a) a deodorizer assembly is connected to disposed immediately below the cyclone separator.

10. The azeotropic extraction assembly as set forth in claim 3 or 5, wherein:

(a) sealing means is disposed between the discharge means and the flash desolventizing conduit.

11. An azeotropic extraction assembly as set forth in claim 1 or 5, wherein:

(a) the cross sectional areas of the upper sections of the column are progressively greater than the lower sections of the column to provide for adjustment of superficial vapor velocity through the column to accomodate different functions therein.

12. The azeotropic extraction assembly as set forth in claim 1 or 5, wherein:

(a) the uppermost section of the column including the top plate and blade assembly forms the dehydration section of the column and has a substantially greater cross sectional area than the lower sections of the column.

13. The azeotropic extraction assembly as set forth in claim 5, wherein:

(a) the vapor supply means includes temperature sensing means disposed within the column immediately below the uppermost top plate and blade assembly which is connected to a control valve for increasing the supply of solvent vapor when the temperature drops to a level a few degrees above the azeotropic boiling point at that location.

14. The azeotropic extraction assembly as set forth in claim 1 or 5, wherein:

(a) the perforate plate and blade assembly includes a plate with plural spaced openings, and (b) the rotating blade is a thin flat blade which is disposed to rotate flatly in a plane slightly above the flat perforate plate, and blade width is slightly wider than each opening in the plate so that the openings are covered as the blade passes over them to provide a valving action between the upwardly moving solvent vapor and the downwardly descending oil bearing solid particles.

* * * * *